(12) United States Patent
Eshel et al.

(10) Patent No.: US 8,890,987 B2
(45) Date of Patent: Nov. 18, 2014

(54) DEVICE AND METHOD FOR AMPLIFICATION AND NOISE COMPENSATION

(75) Inventors: Noam Eshel, Pardessia (IL); Roman Weisman, Carmiel (IL)

(73) Assignee: Pixim Israel Ltd, Raanana (IL)

( * ) Notice: Subject to any disclaimer, the term of this patent is extended or adjusted under 35 U.S.C. 154(b) by 391 days.

(21) Appl. No.: 13/447,316

(22) Filed: Apr. 16, 2012

(65) Prior Publication Data

US 2013/0271632 A1    Oct. 17, 2013

(51) Int. Cl.
*H04N 5/363*    (2011.01)
(52) U.S. Cl.
USPC ............................................. 348/300
(58) Field of Classification Search
CPC ....... H04N 5/357; H04N 5/363; H04N 5/365; H04N 5/3651

USPC ................................................ 348/300
See application file for complete search history.

(56) References Cited

U.S. PATENT DOCUMENTS 6,777,660 B1 * 8/2004 Lee ............................ 250/208.1

* cited by examiner

*Primary Examiner* — Gary C Vieaux
(74) *Attorney, Agent, or Firm* — Rader, Fishman & Grauer PLLC

(57) ABSTRACT

A method and a device having amplification and noise reduction capabilities, the device may include (a) an amplifier; (b) an input circuit that includes multiple sampling circuits, (c) an error capacitor that is arranged to be charged by the amplifier, during a noise integration period, to an error voltage that is indicative of noise generated as a result of a sampling of first and second signals; and (d) a feedback circuit that is arranged to provide to the second input of the amplifier and in proximity to a beginning of second phase of operation, a feedback signal that represents the error voltage and thereby at least partially compensate for the noise.

26 Claims, 7 Drawing Sheets

DEVICE AND METHOD FOR AMPLIFICATION AND NOISE COMPENSATION

FIELD OF THE INVENTION

The invention relates to methods for compensating for noises such as reset and KTC noises and to devices that have noise compensation capabilities.

BACKGROUND OF THE INVENTION

Digital cameras include a pixel arrays. A single pixel can include one or more photo-detectors as well as multiple transistors. Typical photo-detectors include photodiodes, phototransistors, photo-gates, hole accumulation diodes, pinned diodes, avalanche diodes, buried accumulation and transfer layer devices.

The performance of CMOS pixels is limited by their thermal noise. This noise is also known as reset noise of KTC noise. During a reset phase of the pixel a reset voltage is provided to the pixel and especially to a reset transistor of the pixel. When this reset phase ends the reset transistor enters a non-conductive stage and thermal noise is generated.

Various prior art pixels are known. The most commonly used pixels are either CCD pixels or CMOS pixels. Prior art CMOS pixels and two dimensional CMOS arrays are illustrated in the following U.S. patents which are incorporated herein by reference: U.S. Pat. No. 6,777,660 of Lee, titled "CMOS active pixel reset noise reduction"; U.S. Pat. No. 6,762,401 of Lee, titled "CMOS image sensor capable of increasing fill factor and driving method thereof"; U.S. Pat. No. 6,567,495 of Harada titled "solid-state imaging device and a method of reading a signal charge in a solid-state imaging device which can reduce smear and can provide an excellent image characteristics"; U.S. Pat. No. 6,750,912 of Tennant et al., titled "Active-passive imager pixel array with small groups of pixels having short common bus lines"; U.S. Pat. No. 6,697,111 of Kozlowski et al., titled "compact low-noise active pixel sensor with progressive row reset"; U.S. Pat. No. 6,665,013 of Fossum et al., titled "active pixel sensor having intra-pixel charge transfer with analog-to-digital converter"; U.S. Pat. No. 6,587,142 of Kozlowski et al., titled "low-noise active-pixel sensor for imaging arrays with high speed row reset"; U.S. Pat. No. 6,538,245 of Kozlowski, titled "amplified CMOS transducer for single photon read-out of photo-detectors"; U.S. Pat. No. 6,532,040 of Kozlowski et al., titled "low-noise active-pixel sensor for imaging arrays with high-speed row reset"; U.S. Pat. No. 5,892,540 of Kozlowski et al., titled "low noise amplifier for passive pixel CMOS imager"; U.S. Pat. No. 5,238,276 of Dhuse et al., titled "imaging system having a sensor array reset noise reduction mechanism" and U.S. Pat. No. 6,326,230 of Pain et al., titled "high speed CMOS imager with motion artifact suppression and anti-blooming"

Correlated double sampling is a well known technique that can reduce thermal noise but it may suffer from noises introduced during sampling.

There is a need to provide efficient means to improve sampling techniques that exhibit low noise.

SUMMARY OF THE INVENTION

According to an embodiment of the invention a method may be provided and may include sampling, by a first sampling circuit a first signal (S1) during a first phase of operation and during a noise integration period; sampling, by a second sampling circuit a second signal (S2) during a first phase of operation; sampling by a third sampling circuit a third signal (S3) during a second phase of operation; charging an error capacitor, by an amplifier, during the noise integration period, to an error voltage that is indicative of noise generated as a result of the sampling of the first and second signals; wherein the amplifier may include a first input, a second input and an output; providing, by a feedback circuit, to the second input of the amplifier and in proximity to a beginning of the second phase of operation, a feedback signal that represents the error voltage and thereby at least partially compensating for the noise. wherein the input circuit is coupled to an input of the amplifier out of the first input and the second input; wherein the input circuit may include the first till third sampling circuit; wherein the feedback circuit is coupled between the error capacitor and the second input of amplifier.

The first sampling circuit may include a first capacitor (C1), wherein the second and third sampling circuits share a second capacitor (C2); and the method may include outputting by the amplifier, during the second phase of operation an output signal that is substantially equal to $S1-(S3-S2)*C2/C1$.

The first sampling circuit may include a first switch and a first capacitor; wherein the first switch has a first end that may be arranged to receive the first signal and has a second end that is coupled to a first end of a fourth switch and to a first end of a first capacitor; wherein a second end of the fourth switch is coupled to the output of the amplifier; wherein a second end of the first capacitor is coupled to the second input of the amplifier; wherein the method may include closing the first switch during the first phase of operation and during the noise integration period and opening the first switch during the second phase of operation.

The second sampling circuit may include a second switch and a second capacitor; wherein a first end of the second switch may be arranged to receive the second signal and has a second end that is coupled to a first end of a second capacitor; wherein a second end of the second capacitor is coupled to the second input of the amplifier; wherein the third sampling circuit may include a third switch and the second capacitor; wherein a first end of the third switch may be arranged to receive the third signal and has a second end that is coupled to the first end of the second capacitor; wherein the method may include: closing the second switch during the first phase of operation and opening the second switch during the noise integration period and the second phase of operation; and closing the third switch during the second phase of operation and opening the third switch during the noise integration period and the first phase of operation.

The feedback circuit may include a feedback switch; and wherein the method may include closing the feedback switch during the first phase of operation and during a portion of the noise integration period and opening the feedback switch during the second phase of operation.

The portion of the noise integration period may be shorter than one third of the noise integration period.

The noise integration period may be substantially equal by length to the first phase of operation.

The feedback circuit may include a variable capacitor having a capacitance that is set by a control signal; wherein the capacitance of the variable capacitor affects an amplitude of the feedback signal; and wherein the method may include setting the capacitance of the variable capacitor.

The method may include determining, by an calibration circuit, a desired capacitance of the variable capacitor and sending to the variable capacitor a control signal that causes the variable capacitor to have the desired capacitance.

The method may include determining, by the calibration circuit, the desired capacitance of the variable capacitor based upon an expected compensation of noise provided by feedback circuit once the variable capacitor is set to have the desired capacitance.

The calibration circuit may include an evaluated circuit, an noise signal generator and a processing circuit; wherein the evaluated circuit substantially equals a combination of the amplifier, the input circuit, the feedback circuit and the error capacitor; wherein the method may include: injecting, by the noise signal generator and during different evaluation iterations, error signals of different values to the evaluated circuit; and determining by the processing circuit the control signal based upon reactions of the evaluated circuit to the error signals of different values.

The first and second signals may be sampled from a pixel during different phases of operation of the pixel.

Additional embodiments of the invention include a device arranged to execute the method described above, including any stages-and any combinations of same. For example, the device may include an amplifier that may include a first input, a second input and an output; an input circuit that is coupled to an input of the amplifier out of the first input and the second input; wherein the input circuit may include: a first sampling circuit that is arranged to sample a first signal (S1) during a first phase of operation and during a noise integration period; a second sampling circuit that is arranged to sample a second signal (S2) during a first phase of operation; and a third sampling circuit arranged to sample a third signal (S3) during a second phase of operation; an error capacitor that is coupled to the output of the amplifier; wherein the error capacitor is arranged to be charged by the amplifier, during the noise integration period, to an error voltage that is indicative of noise generated as a result of a sampling of the first and second signals; and a feedback circuit coupled between the error capacitor and the second input of amplifier; wherein the feedback circuit is arranged to provide to the second input of the amplifier and in proximity to a beginning of the second phase of operation, a feedback signal that represents the error voltage and thereby at least partially compensate for the noise.

The first sampling circuit may include a first capacitor (C1), wherein the second and third sampling circuits share a second capacitor (C2); and wherein the amplifier may be arranged to output, during the second phase of operation an output signal that is substantially equal to S−(S−S2)*C2/C.

The first sampling circuit may include a first switch and a first capacitor; wherein the first switch has a first end that may be arranged to receive the first signal and has a second end that is coupled to a first end of a fourth switch and to a first end of a first capacitor; wherein a second end of the fourth switch is coupled to the output of the amplifier; wherein a second end of the first capacitor is coupled to the second input of the amplifier; wherein the first switch may be arranged to be closed during the first phase of operation and during the noise integration period and to be opened during the second phase of operation.

The second sampling circuit may include a second switch and a second capacitor; wherein a first end of the second switch may be arranged to receive the second signal and has a second end that is coupled to a first end of a second capacitor; wherein a second end of the second capacitor is coupled to the second input of the amplifier; wherein the second switch may be arranged to be closed during the first phase of operation and to be opened during the noise integration period and the second phase of operation; wherein the third sampling circuit may include a third switch and the second capacitor; wherein a first end of the third switch may be arranged to receive the third signal and has a second end that is coupled to the first end of the second capacitor; wherein the third switch may be arranged to be closed during the second phase of operation and to be opened during the noise integration period and the first phase of operation.

The feedback circuit may include a feedback switch that may be arranged to be closed during the first phase of operation and during a portion of the noise integration period and to be opened during the second phase of operation.

The portion of the noise integration period may be shorter than one third of the noise integration period.

The noise integration period may be substantially equal by length to the first phase of operation.

The feedback circuit may include a variable capacitor having a capacitance that is set by a control signal; wherein the capacitance of the variable capacitor affects an amplitude of the feedback signal.

The device may include an calibration circuit that may be arranged to determine a desired capacitance of the variable capacitor and to send to the variable capacitor a control signal that causes the variable capacitor to have the desired capacitance.

The calibration circuit may be arranged to determine the desired capacitance of the variable capacitor based upon an expected compensation of noise provided by feedback circuit once the variable capacitor is set to have the desired capacitance.

The calibration circuit may include an evaluated circuit, an noise signal generator and a processing circuit; wherein the evaluated circuit substantially equals a combination of the amplifier, the input circuit, the feedback circuit and the error capacitor; wherein the noise signal generator may be arranged to inject, during different evaluation iterations, error signals of different values to the evaluated circuit; and wherein the processing circuit is coupled to the output of the evaluated circuit and may be arranged to determine the control signal based upon reactions of the evaluated circuit to the error signals of different values.

The first and second signals may be sampled from a pixel during different phases of operation of the pixel.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
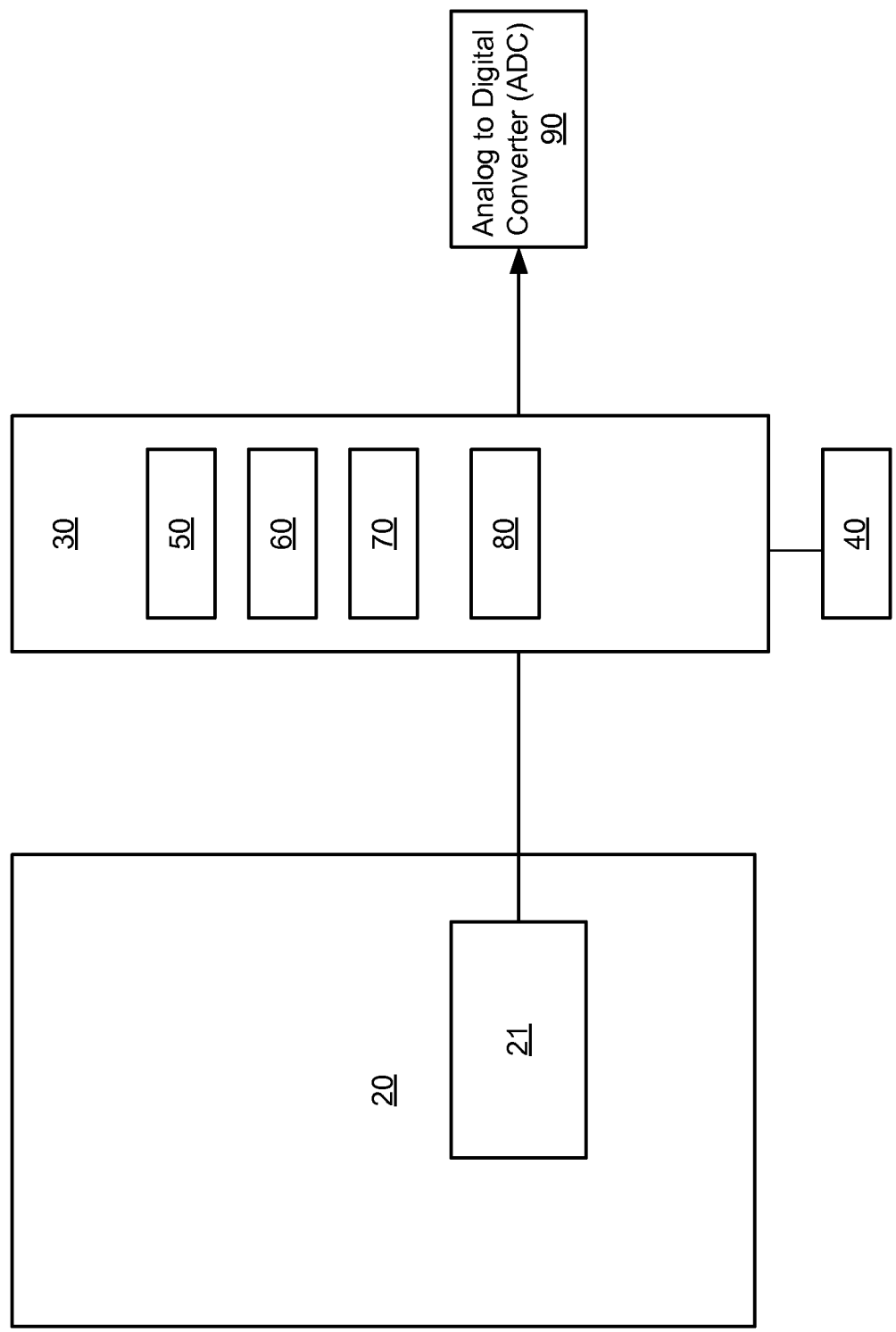
FIG. 1 illustrates a device according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

FIG. 1 illustrates a device 10 according to an embodiment of the invention. Device 10 may include a pixel array 20, a readout circuit 30 and a calibration circuit 40. The pixel array 20 may include multiple pixels. The readout circuit 30 may be arranged to read the pixels (for example—one group of pixels at a time) and may include (a) analog components such as input circuit 50, amplifier 60, error capacitor 70 and feedback circuit 80, (b) hybrid components such as analog to digital converter (ADC) 90, and (c) zero or more digital components (not shown).

As will be illustrated below—the input circuit 50 can sample a pixel (such as pixel 21) at different phases of operation of the pixel—such as after reset, after integration, and the like.

The ADC 90 can output signals within a voltage range that has width of Vrange and that spans from an upper limit of Vinit to a lower limit of (Vinit-Vrange).

Figure 2:
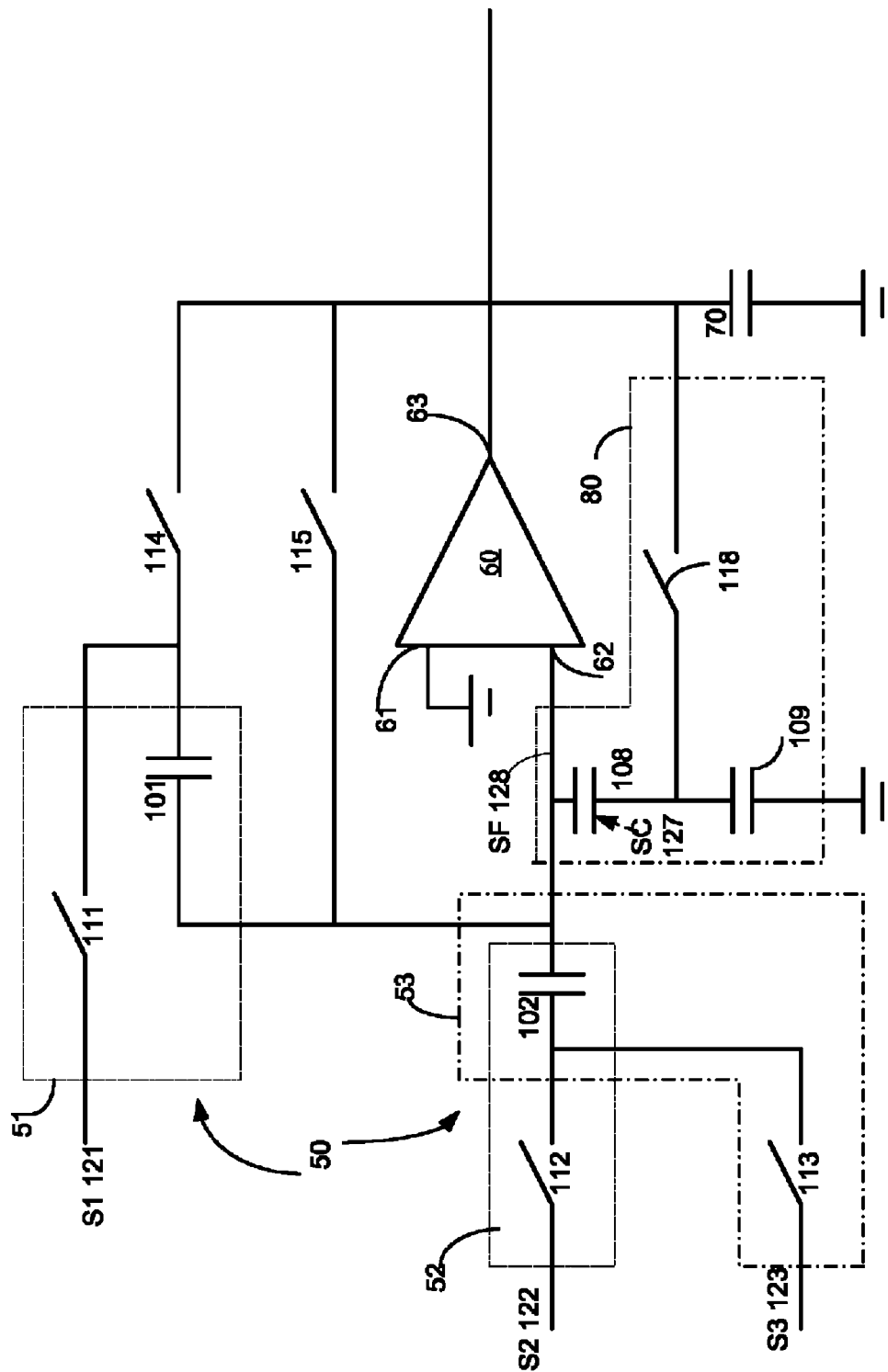
FIG. 2 illustrates an amplifier, an input circuit, an error capacitor and a feedback circuit according to an embodiment of the invention.

Referring to FIG. 2, the amplifier 60 includes a first input 61, a second input 62 and an output 63. The input circuit 50 is connected to an input of the amplifier out of the first input 61 and the second input 62.

The input circuit 50 may include: (a) a first sampling circuit 51 that is arranged to sample a first signal S1 121 during a first phase of operation and during a noise integration period; (b) a second sampling circuit 52 that is arranged to sample a second signal S2 122 during a first phase of operation; and a third sampling circuit 53 arranged to sample a third signal S3 123 during a second phase of operation.

The error capacitor 70 is connected to the output 63 of the amplifier. The error capacitor 70 is arranged to be charged by the amplifier 60, during the noise integration period, to an error voltage that is indicative of noise generated as a result of a sampling of the first and second signals.

The feedback circuit 80 is connected between the error capacitor 70 and the second input 62 of amplifier. The feedback circuit 80 is arranged to provide to the second input 62 of the amplifier and in proximity to a beginning of the second phase of operation, a feedback signal that represents the error voltage and thereby at least partially compensate for the noise.

The first sampling circuit 51 may include a first capacitor (C1) 101, wherein the second and third sampling circuits 52 and 53 share a second capacitor (C2) 102.

The amplifier 60 may be arranged to output, during the second phase of operation an output signal that is substantially equal to S1−(S3−S2)*C2/C1.

The first sampling circuit 51 may include a first switch 111 and the first capacitor 101. The first switch 111 has a first end that may be arranged to receive the first signal S1 121 and has a second end that is connected to a first end of a fourth switch 114 and to a first end of the first capacitor 101.

A second end of the fourth switch 114 is connected to the output 63 of the amplifier. A second end of the first capacitor 101 is connected to the second input 62 of the amplifier. The first switch 111 may be arranged to be closed during the first phase of operation and during the noise integration period and to be opened during the second phase of operation.

The second sampling circuit 52 may include a second switch 112 and a second capacitor 102. A first end of the second switch 112 may be arranged to receive the second signal S2 122 and has a second end that is connected to a first end of the second capacitor 102. A second end of the second capacitor 102 is connected to the second input 62 of the amplifier. The second switch 112 may be arranged to be closed during the first phase of operation and to be opened during the noise integration period and the second phase of operation.

The third sampling circuit 53 may include a third switch 113 and the second capacitor 102. A first end of the third switch 113 may be arranged to receive the third signal S3 123 and has a second end that is connected to the first end of the second capacitor 102. The third switch 113 may be arranged to be closed during the second phase of operation and to be opened during the noise integration period and the first phase of operation.

The feedback circuit 80 may include a feedback switch 118 that may be arranged to be closed during the first phase of operation and during a portion of the noise integration period and to be opened during the second phase of operation.

The portion of the noise integration period may be shorter than one third of the noise integration period.

The noise integration period may be substantially equal by length to the first phase of operation.

The feedback circuit 80 may include a variable capacitor 108 having a capacitance that is set by a control signal SC 127. The capacitance of the variable capacitor 108 affects the amplitude of the feedback signal SF 128. FIG. 2 illustrates an additional capacitor 109 that is connected in series to the variable capacitor 108, wherein the feedback switch 118 is connected to a node between the variable capacitor 108 and the additional capacitor 109.

The second and input 62 and the output 63 of the amplifier 60 may be connected to each other by a fifth switch 115 that is closed during the first phase of operation and is opened during the noise integration circuit and the second phase of operation.

Figure 3:
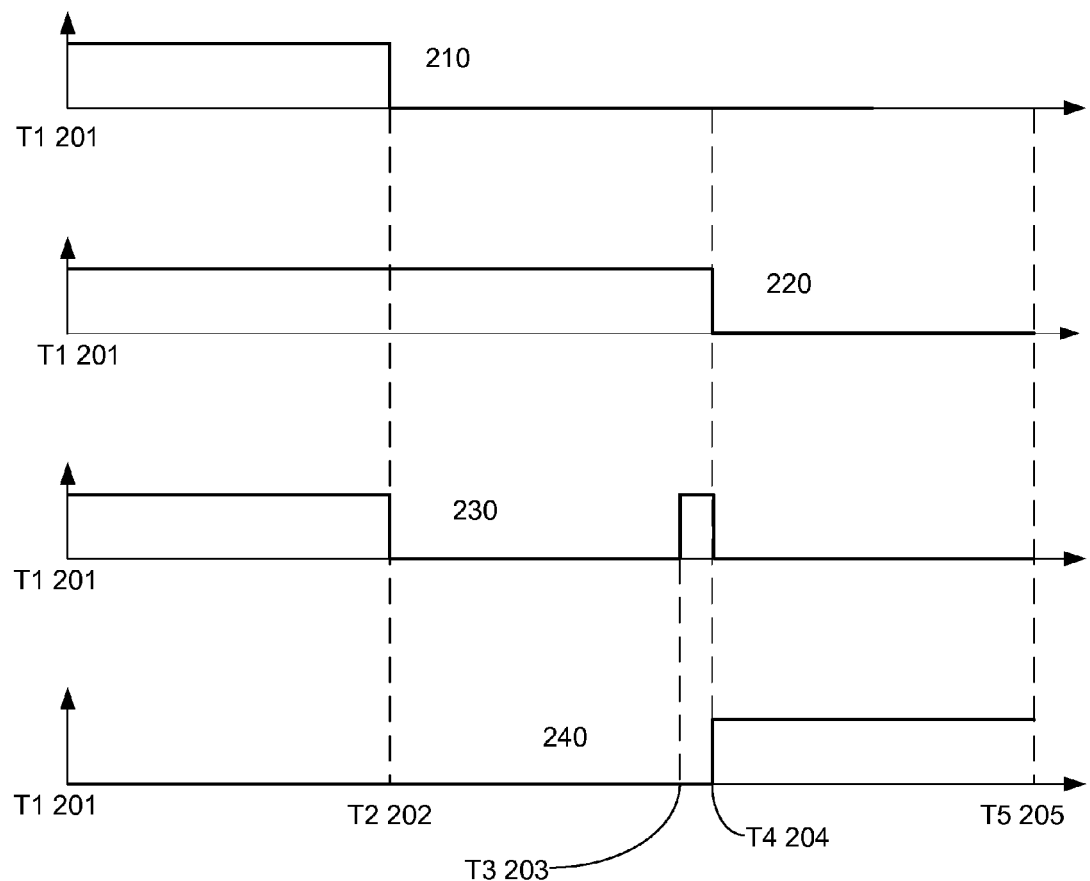
FIG. 3 is a timing diagram according to an embodiment of the invention.

FIG. 3 is a timing diagram 200 according to an embodiment of the invention.

The timing diagram 200 illustrates the opening and closing periods of the different switches of FIG. 2. An asserted signal indicates that an appropriate switch is closed (its ends are shortened to each other) while a reset signal indicates that an appropriate switch is open (and both of its ends are disconnected from each other).

Timing diagram 200 includes waveforms 210, 220, 230 and 240.

First waveform 210 illustrates a first control signal that is asserted during a first phase of operation that spans between first point of time T1 201 and second point of time T2 202. The first control signal may be provided to the second sampling circuit 52.

Second waveform 220 illustrates a second control signal that is asserted during the first phase of operation (between T1 201 and T2 202) and between the noise integration period (between second point of time T2 202 and fourth point of time T4 204). This second control signal can be provided to the first sampling circuit 51.

Third waveform 230 illustrates a third control signal that is asserted during the first phase of operation and during a portion of the noise integration period. The portion spans between third point of time T3 203 and fourth point of time T4 204.

Fourth waveform 240 illustrates a control signal that is asserted during a second phase of operation that spans between fourth point of time T4 204 and fifth point of time T5 205.

The fifth point in time T5 205 can be regarded as the first point in time of the next iteration of sampling and noise cancelling.

Figure 4:
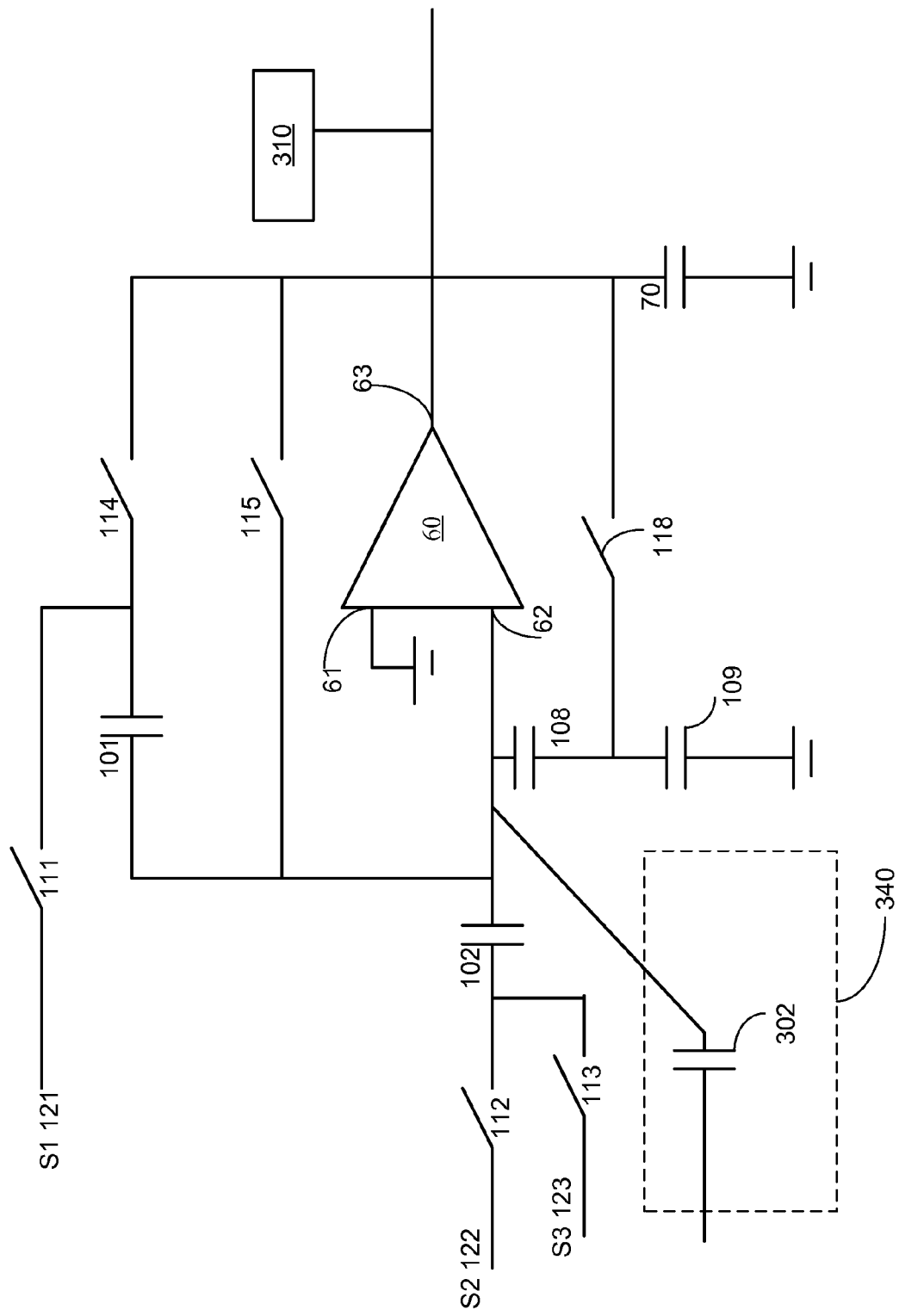
FIG. 4 illustrates an amplifier, an input circuit, an error capacitor, a feedback circuit, a noise signal generator and a processing circuit according to an embodiment of the invention.

FIG. 4 illustrates an amplifier 60, an input circuit 50, an error capacitor 70, a feedback circuit 80, a noise signal generator 340 and a processing circuit 310, according to an embodiment of the invention.

The arrangement of the an amplifier 60, an input circuit 50, an error capacitor 70, a feedback circuit 80 is the same as the arrangement illustrated in FIG. 2. In addition to these components, FIG. 4 illustrates a noise signal generator 340 that is connected to the second input 62 of the amplifier 60 and is arranged to inject noise during the noise integration period. The injection circuit includes a capacitor 302 that is connected at one end to second input 62 and receives at another end the injected noise.

This injected noise is used to test whether the feedback circuit 80 compensates this noise. By comparing output signals that are outputted from the output 63 of the amplifier 60 with injected noise of different values (including a zero valued injected noise) a processing circuit 310 can determine whether the feedback circuit 80 properly compensates for noises or not.

For example, if the value of the output signal does not differ (or does not substantially differs) regardless of the value of the injected noise then the feedback circuit 80 properly compensates for noises. Else (if the changes in the values of the injected noise result in substantially differences then the feedback circuit 80 does not properly compensate for noises and its gain should be altered. The gain can be altered by various manners such as changing a capacitance of a variable capacitor of the feedback circuit.

Figure 5:
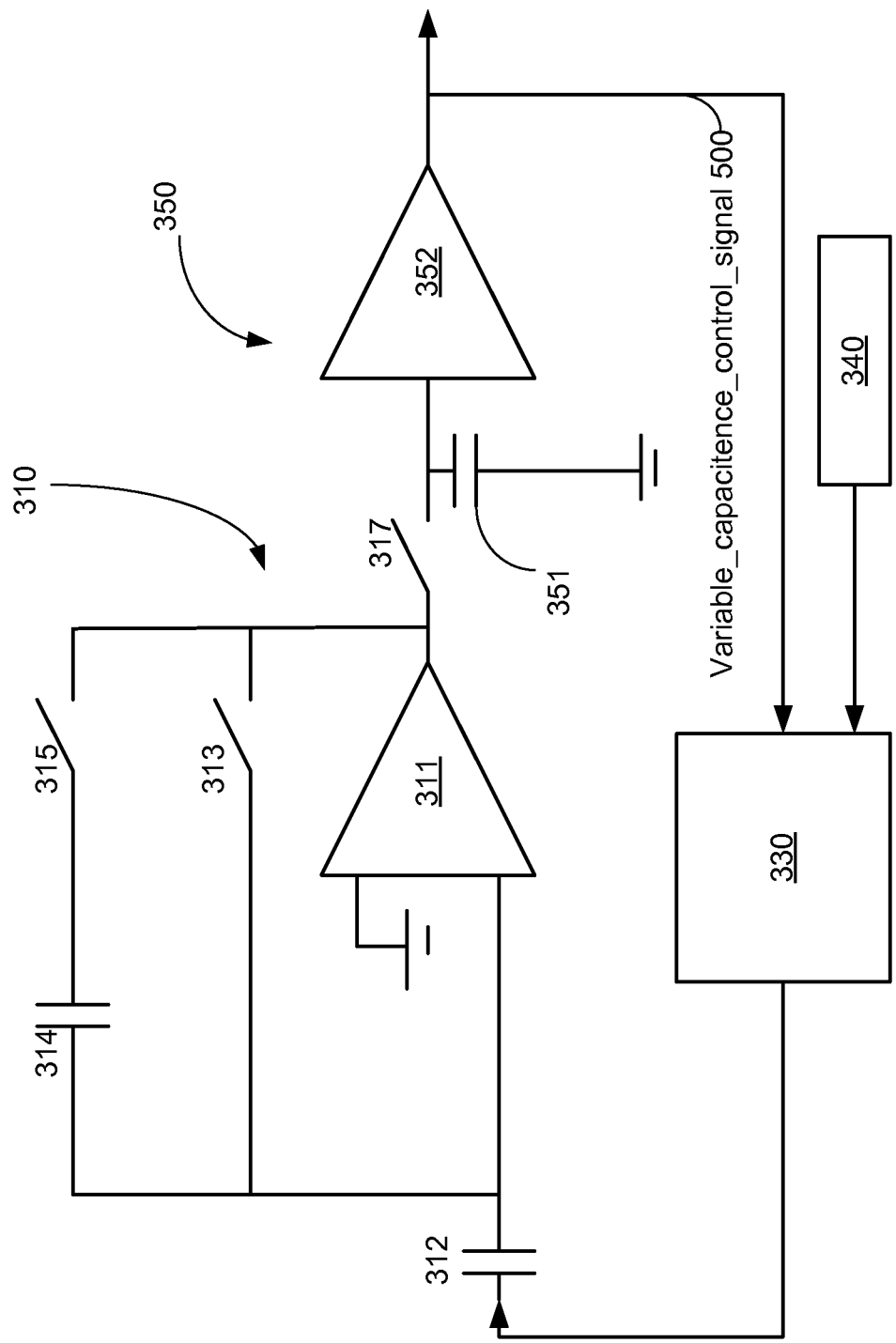
FIG. 5 illustrates a calibration circuit according to an embodiment of the invention.

FIG. 5 illustrates an calibration circuit 400 according to an embodiment of the invention.

One calibration circuit 400 can be provided for multiple feedback circuits 80. The calibration circuit can determine a desired capacitance of the variable capacitors 108 of the feedback circuits 80 by sending a control signal to each of these variable capacitors 108 that will cause them to have the desired capacitance.

The calibration circuit 400 may be arranged to determine the desired capacitance of the variable capacitors 108 based upon an expected compensation of noise provided by feedback circuits 80 once the variable capacitors 108 are set to have the desired capacitance.

The calibration circuit 400 may include an evaluated circuit 330, a noise signal generator 340, a processing circuit 310, an intermediate switch 317 and a buffering circuit 350.

The intermediate switch 317 is connected between the processing circuit 310 and the buffering circuit 350 and may be closed during even calibration iterations and be opened during odd calibration iterations.

The noise signal generator 340 can provide to the evaluated circuit 330 noise signals of different values—for example nose signals provided during odd calibration iterations can be higher than those provided (if provided) during even calibration iterations.

The evaluated circuit 330 substantially equals a combination of the amplifier 60, the input circuit 50, the feedback circuit 80 and the error capacitor 70.

The noise signal generator 340 may be arranged to inject, during different evaluation iterations, error signals of different values to the evaluated circuit 330.

The processing circuit 310 is connected to the output of the evaluated circuit 330 and may be arranged to determine the control signal (denoted Variable_capacitence_control_signal 500) based upon reactions of the evaluated circuit 330 to the error signals of different values.

FIG. 5 illustrates the processing circuit 310 as being an integrator that include amplifier 311, first capacitor 312, first switch 313, second capacitor 314 and second switch 315.

A positive input of amplifier 311 is grounded and a second input of the amplifier 311 is connected to a second end of first capacitor 312, to a first end of first switch 313 and to a first end of second capacitor 314. The first end of the first capacitor 312 is connected to the output of the evaluated circuit 330.

A second end of the second capacitor 314 is connected to a first end of the second switch 315. A second end of the second switch 315 and a second end of the first switch 313 are connected to the output of the amplifier 311. The second end of the second capacitor 314 can receive initial conditions signals (not shown) during a first iteration of calibration.

First switch 313 is opened during even calibration iterations and closed during odd calibration iterations. Thus, odd calibration iterations do not involve injecting noise.

The second switch 315 is opened during odd calibration iterations and closed during even calibration. Thus, even calibration iterations involve injecting noise.

Referring to FIG. 2, each calibration iteration can start at first point in time T1 201 and end at fifth point in time T5 205.

The buffering circuit 350 includes a smoothing capacitor 351 and a buffer unit 352. The buffering unit 350 outputs a control signal to multiple feedback circuits 80 and also provides this control signal to the feedback circuit of the evaluated circuit 330.

The processing circuit 310 and buffering circuit 350 form a negative feedback loop that is aimed to reduce errors resulting from in appropriate noise compensation. This feedback loop aims to configure the evaluated circuit so that it outputs the same output signal at the end of odd and even calibration iterations.

For example, assuming that the evaluated circuit 330 outputs at an end of a even calibration iteration an output signal that is higher than the output signal it outputted during the last odd calibration iteration then the control signal outputted at the end of the even calibration iteration will cause the variable capacitor to increase its value resulting by an increase in the gain of the feedback circuit and a reduction in the output signal.

Figure 6:
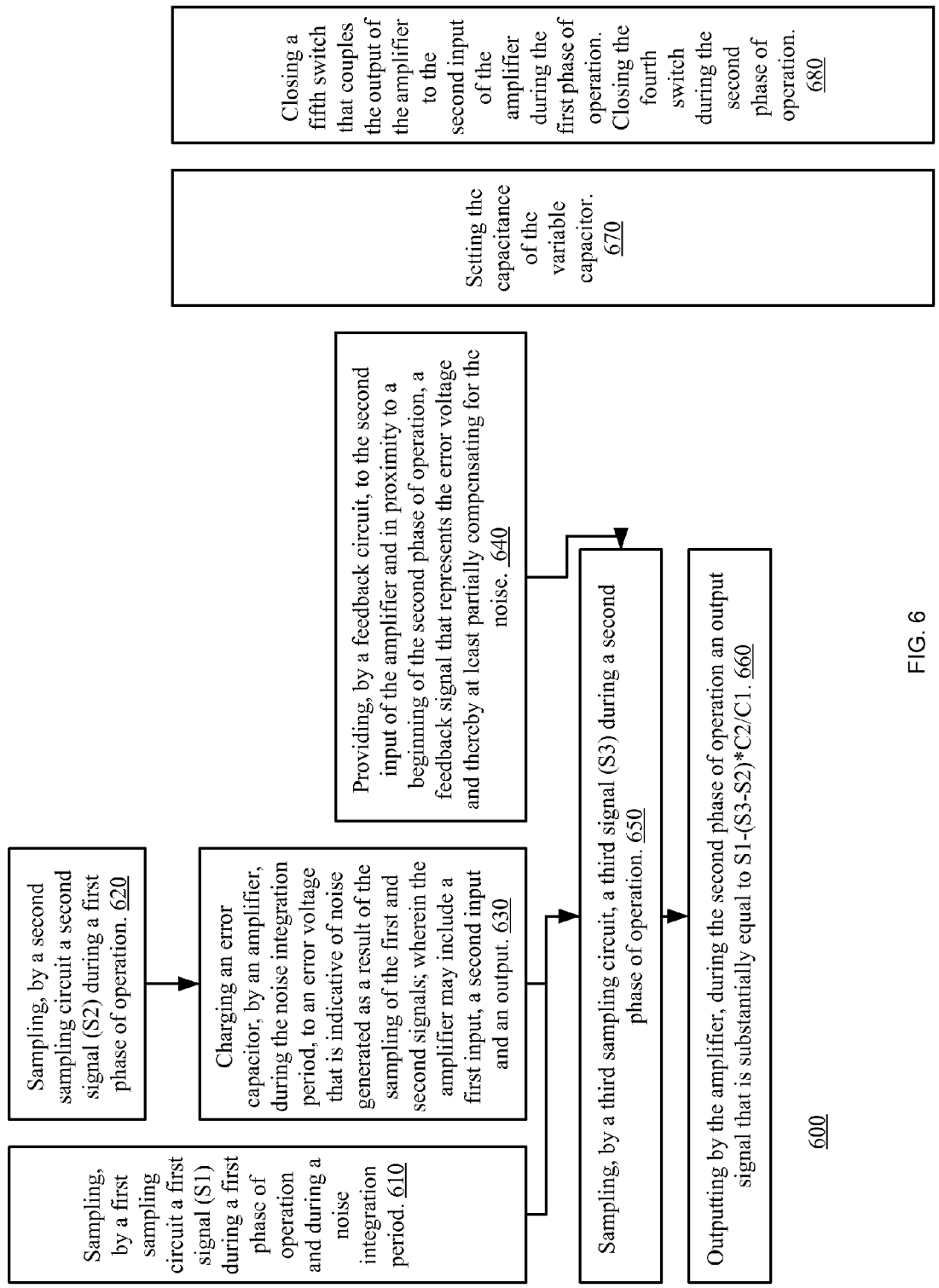
FIG. 6 illustrates a method according to an embodiment of the invention.

FIG. 6 illustrates method 600 according to an embodiment of the invention.

Method 600 may start by stage 610 and 620.

Stage 610 includes sampling, by a first sampling circuit a first signal (S1) during a first phase of operation and during a noise integration period. Stage 610 may be followed by stage 650.

Stage 620 includes sampling, by a second sampling circuit a second signal (S2) during a first phase of operation.

The first and second signals may be sampled from a pixel during different phases of operation of the pixel.

Stage 620 may be followed by stage 630 of charging an error capacitor, by an amplifier, during the noise integration period, to an error voltage that is indicative of noise generated as a result of the sampling of the first and second signals; wherein the amplifier may include a first input, a second input and an output.

Stage 620 may also be followed by stage 640 of providing, by a feedback circuit, to the second input of the amplifier and in proximity to a beginning of the second phase of operation, a feedback signal that represents the error voltage and thereby at least partially compensating for the noise. Wherein the input circuit is connected to an input of the amplifier out of the first input and the second input. The input circuit may include the first till third sampling circuit. The feedback circuit is connected between the error capacitor and the second input of amplifier.

Stage 650 may include sampling, by a third sampling circuit, a third signal (S3) during a second phase of operation.

The first sampling circuit may include a first capacitor (C1), wherein the second and third sampling circuits share a second capacitor (C2). Method 600 may include stage 660 of outputting by the amplifier, during the second phase of operation an output signal that is substantially equal to S1−(S3−S2)*C2/C1.

The first sampling circuit may include a first switch and a first capacitor. The first switch has a first end that may be arranged to receive the first signal and has a second end that is coupled to a first end of a fourth switch and to a first end of a first capacitor; wherein a second end of the fourth switch is coupled to the output of the amplifier; wherein a second end of the first capacitor is coupled to the second input of the amplifier. Stage 610 may include closing the first switch during the first phase of operation and during the noise integration period. Stage 650 may include opening the first switch during the second phase of operation.

The second sampling circuit may include a second switch and a second capacitor; wherein a first end of the second switch may be arranged to receive the second signal and has a second end that is coupled to a first end of a second capacitor; wherein a second end of the second capacitor is coupled to the second input of the amplifier; wherein the third sampling circuit may include a third switch and the second capacitor; wherein a first end of the third switch may be arranged to receive the third signal and has a second end that is coupled to the first end of the second capacitor. Stage 620 may include closing the second switch during the first phase of operation. Stage 630 may include opening the second switch during the noise integration period. Stage 650 may include opening the second switch during the second phase of operation. Stage 650 may include and closing the third switch during the second phase of operation. Stage 610 may include opening the third switch during the noise integration period and the first phase of operation.

The feedback circuit may include a feedback switch. Stage 640 may include closing the feedback switch during a portion of the noise integration period and during the first phase of operation. Stage 620 may include opening the feedback switch during another portion of the noise integration period and during the second phase of operation. Stage 650 may include opening the feedback switch during the second phase of operation.

The portion of the noise integration period may be shorter than one third of the noise integration period.

The noise integration period may be substantially equal by length to the first phase of operation.

The feedback circuit may include a variable capacitor having a capacitance that is set by a control signal; wherein the capacitance of the variable capacitor affects the amplitude of the feedback signal. Method 600 may include stage 670 of setting the capacitance of the variable capacitor.

Method 600 may also include stage 680 of closing a fifth switch that couples the output of the amplifier to the second input of the amplifier during the first phase of operation and opening the fifth switch during the noise integration circuit and the second phase of operation. Stage 680 may also include closing the fourth switch during the second phase of operation and opening the fourth switch during the noise integration circuit and the first phase of operation.

Figure 7:
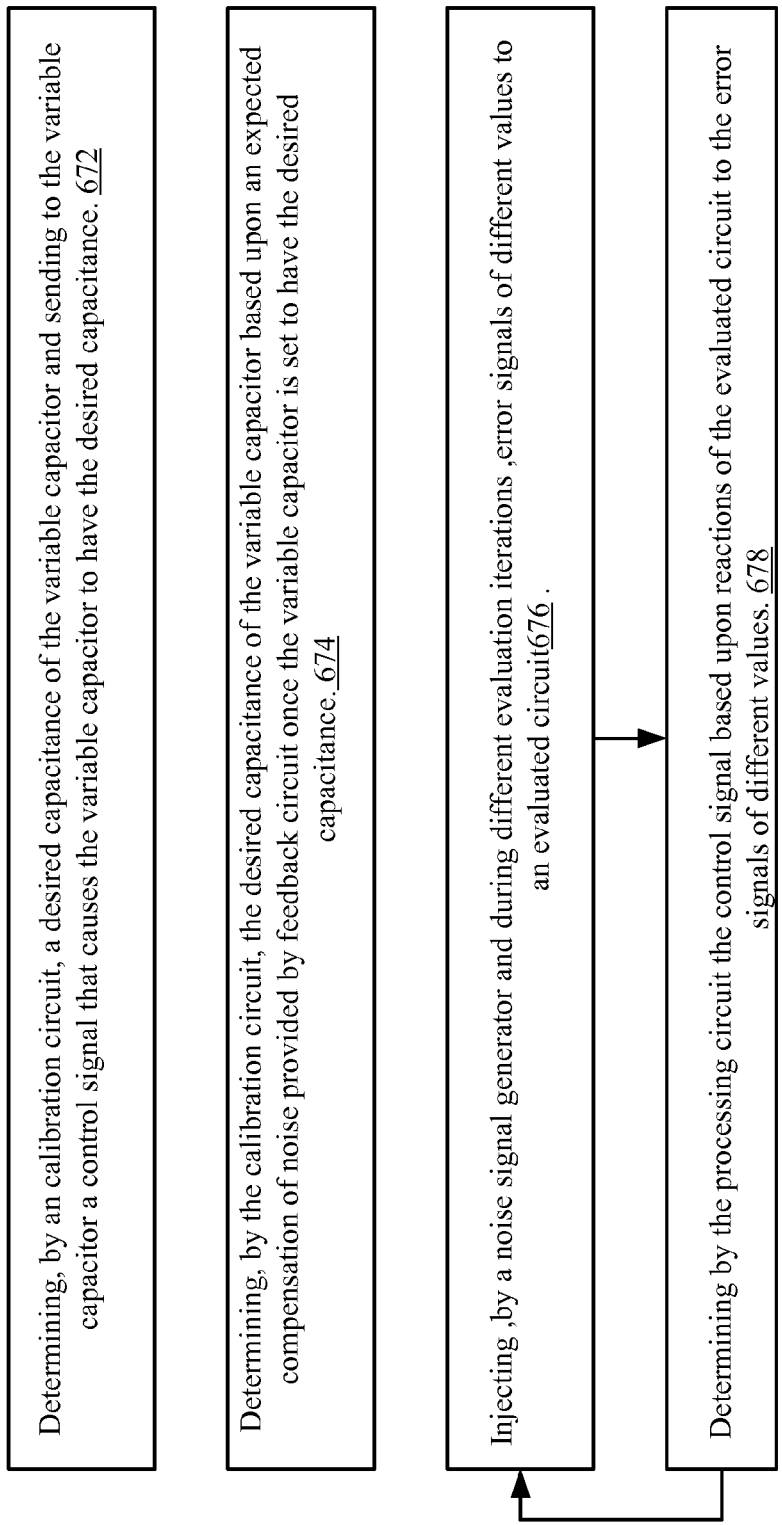
FIG. 7 illustrates a various stages of one of the stages of the method of FIG. 6 according to an embodiment of the invention.

FIG. 7 illustrates various stages of stage 670 according to an embodiment of the invention.

Stage 670 may include stage 672 of determining, by an calibration circuit, a desired capacitance of the variable capacitor and sending to the variable capacitor a control signal that causes the variable capacitor to have the desired capacitance.

Stage 670 may include stage 674 of determining, by the calibration circuit, the desired capacitance of the variable capacitor based upon an expected compensation of noise provided by feedback circuit once the variable capacitor is set to have the desired capacitance.

The calibration circuit may include an evaluated circuit, an noise signal generator and a processing circuit; wherein the evaluated circuit substantially equals a combination of the amplifier, the input circuit, the feedback circuit and the error capacitor. Stage 670 may include stage 676 of injecting, by the noise signal generator and during different evaluation iterations, error signals of different values to the evaluated circuit; and stage 678 of determining by the processing circuit the control signal based upon reactions of the evaluated circuit to the error signals of different values.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A device having amplification and noise reduction capabilities, comprising:
    an amplifier that comprises a first input, a second input and an output;
    an input circuit that is coupled to an input of the amplifier out of the first input and the second input; wherein the input circuit comprises:
        a first sampling circuit that is arranged to sample a first signal (S1) during a first phase of operation and during a noise integration period;

a second sampling circuit that is arranged to sample a second signal (S2) during a first phase of operation; and a third sampling circuit arranged to sample a third signal (S3) during a second phase of operation;

an error capacitor that is coupled to the output of the amplifier; wherein the error capacitor is arranged to be charged by the amplifier, during the noise integration period, to an error voltage that is indicative of noise generated as a result of a sampling of the first and second signals; and a feedback circuit coupled between the error capacitor and the second input of amplifier; wherein the feedback circuit is arranged to provide to the second input of the amplifier and in proximity to a beginning of the second phase of operation, a feedback signal that represents the error voltage and thereby at least partially compensate for the noise.

2. The device according to claim 1, wherein the first sampling circuit comprises a first capacitor (C1), wherein the second and third sampling circuits share a second capacitor (C2); and wherein the amplifier is arranged to output, during the second phase of operation an output signal that is substantially equal to S1−(S3−S2)*C2/C1.

3. The device according to claim 1, wherein the first sampling circuit comprises a first switch and a first capacitor; wherein the first switch has a first end that is arranged to receive the first signal and has a second end that is coupled to a first end of a fourth switch and to a first end of a first capacitor; wherein a second end of the fourth switch is coupled to the output of the amplifier; wherein a second end of the first capacitor is coupled to the second input of the amplifier; wherein the first switch is arranged to be closed during the first phase of operation and during the noise integration period and to be opened during the second phase of operation.

4. The device according to claim 3, wherein the second sampling circuit comprises a second switch and a second capacitor; wherein a first end of the second switch is arranged to receive the second signal and has a second end that is coupled to a first end of a second capacitor; wherein a second end of the second capacitor is coupled to the second input of the amplifier; wherein the second switch is arranged to be closed during the first phase of operation and to be opened during the noise integration period and the second phase of operation; wherein the third sampling circuit comprises a third switch and the second capacitor; wherein a first end of the third switch is arranged to receive the third signal and has a second end that is coupled to the first end of the second capacitor; wherein the third switch is arranged to be closed during the second phase of operation and to be opened during the noise integration period and the first phase of operation.

5. The device according to claim 1, wherein the feedback circuit comprises a feedback switch that is arranged to be closed during the first phase of operation and during a portion of the noise integration period and to be opened during the second phase of operation.

6. The device according to claim 5, wherein the portion of the noise integration period is shorter than one third of the noise integration period.

7. The device according to claim 1, wherein the noise integration period is substantially equal by length to the first phase of operation.

8. The device according to claim 1, wherein the feedback circuit comprises a variable capacitor having a capacitance that is set by a control signal; wherein the capacitance of the variable capacitor affects an amplitude of the feedback signal.

9. The device according to claim 8, comprising an calibration circuit that is arranged to determine a desired capacitance of the variable capacitor and to send to the variable capacitor a control signal that causes the variable capacitor to have the desired capacitance.

10. The device according to claim 9, wherein the calibration circuit that is arranged to determine the desired capacitance of the variable capacitor based upon an expected compensation of noise provided by feedback circuit once the variable capacitor is set to have the desired capacitance.

11. The device according to claim 9, wherein the calibration circuit comprises an evaluated circuit, an noise signal generator and a processing circuit; wherein the evaluated circuit substantially equals a combination of the amplifier, the input circuit, the feedback circuit and the error capacitor; wherein the noise signal generator is arranged to inject, during different evaluation iterations, error signals of different values to the evaluated circuit; and wherein the processing circuit is coupled to the output of the evaluated circuit and is arranged to determine the control signal based upon reactions of the evaluated circuit to the error signals of different values.

12. The device according to claim 1, wherein the first and second signals are sampled from a pixel during different phases of operation of the pixel.

13. The device according to claim 1, comprising a fifth switch that is coupled between the output and the second input of the amplifier, wherein the fifth switch is arranged to be closed during the second phase of operation and be opened during the noise integration circuit and the first phase of operation.

14. A method for amplification and noise reduction, the method comprises:
sampling, by a first sampling circuit a first signal (S1) during a first phase of operation and during a noise integration period;
sampling, by a second sampling circuit a second signal (S2) during a first phase of operation;
sampling by a third sampling circuit a third signal (S3) during a second phase of operation;
charging an error capacitor, by an amplifier, during the noise integration period, to an error voltage that is indicative of noise generated as a result of the sampling of the first and second signals; wherein the amplifier comprises a first input, a second input and an output;
providing, by a feedback circuit, to the second input of the amplifier and in proximity to a beginning of the second phase of operation, a feedback signal that represents the error voltage and thereby at least partially compensating for the noise;
wherein the input circuit is coupled to an input of the amplifier out of the first input and the second input; wherein the input circuit comprises the first till third sampling circuit; wherein the feedback circuit is coupled between the error capacitor and the second input of amplifier.

15. The method according to claim 14, wherein the first sampling circuit comprises a first capacitor (C1), wherein the second and third sampling circuits share a second capacitor (C2); and
wherein the method comprises outputting by the amplifier, during the second phase of operation an output signal that is substantially equal to S1−(S3−S2)*C2/C1.

16. The method according to claim 14, wherein the first sampling circuit comprises a first switch and a first capacitor; wherein the first switch has a first end that is arranged to receive the first signal and has a second end that is coupled to a first end of a fourth switch and to a first end of a first capacitor; wherein a second end of the fourth switch is coupled to the output of the amplifier; wherein a second end of the first capacitor is coupled to the second input of the amplifier;

wherein the method comprises closing the first switch during the first phase of operation and during the noise integration period and opening the first switch during the second phase of operation.

17. The method according to claim 16, wherein the second sampling circuit comprises a second switch and a second capacitor; wherein a first end of the second switch is arranged to receive the second signal and has a second end that is coupled to a first end of a second capacitor; wherein a second end of the second capacitor is coupled to the second input of the amplifier;

wherein the third sampling circuit comprises a third switch and the second capacitor; wherein a first end of the third switch is arranged to receive the third signal and has a second end that is coupled to the first end of the second capacitor;

wherein the method comprises:

closing the second switch during the first phase of operation and opening the second switch during the noise integration period and the second phase of operation; and closing the third switch during the second phase of operation and opening the third switch during the noise integration period and the first phase of operation.

18. The method according to claim 14, wherein the feedback circuit comprises a feedback switch; and wherein the method comprises closing the feedback switch during the first phase of operation and during a portion of the noise integration period and opening the feedback switch during the second phase of operation.

19. The method according to claim 18, wherein the portion of the noise integration period is shorter than one third of the noise integration period.

20. The method according to claim 14, wherein the noise integration period is substantially equal by length to the first phase of operation.

21. The method according to claim 14, wherein the feedback circuit comprises a variable capacitor having a capacitance that is set by a control signal; wherein the capacitance of the variable capacitor affects an amplitude of the feedback signal; and wherein the method comprises setting the capacitance of the variable capacitor.

22. The method according to claim 21, comprising determining, by an calibration circuit, a desired capacitance of the variable capacitor and sending to the variable capacitor a control signal that causes the variable capacitor to have the desired capacitance.

23. The method according to claim 22, comprising determining, by the calibration circuit, the desired capacitance of the variable capacitor based upon an expected compensation of noise provided by feedback circuit once the variable capacitor is set to have the desired capacitance.

24. The method according to claim 21, wherein the calibration circuit comprises an evaluated circuit, an noise signal generator and a processing circuit; wherein the evaluated circuit substantially equals a combination of the amplifier, the input circuit, the feedback circuit and the error capacitor;

wherein the method comprises:

injecting, by the noise signal generator and during different evaluation iterations, error signals of different values to the evaluated circuit; and determining by the processing circuit the control signal based upon reactions of the evaluated circuit to the error signals of different values.

25. The method according to claim 14, wherein the first and second signals are sampled from a pixel during different phases of operation of the pixel.

26. The method according to claim 14, comprising closing a fifth switch during the second phase of operation and opening the fifth switch during the noise integration circuit and the first phase of operation, wherein the fifth switch is coupled between the output and the second input of the amplifier.

* * * * *